United States Patent
Chida et al.

(10) Patent No.: US 10,784,788 B2
(45) Date of Patent: Sep. 22, 2020

(54) REACTOR AND DC-DC CONVERTER USING SAME

(71) Applicant: Hitachi Automotive Systems, Ltd., Hitachinaka-shi, Ibaraki (JP)

(72) Inventors: Tadahiko Chida, Tokyo (JP); Akihiro Goto, Ibaraki (JP)

(73) Assignee: Hitachi Automotive Systems, Ltd., Hitachinaka-shi (JP)

( * ) Notice: Subject to any disclaimer, the term of this patent is extended or adjusted under 35 U.S.C. 154(b) by 132 days.

(21) Appl. No.: 15/320,500

(22) PCT Filed: Jul. 1, 2015

(86) PCT No.: PCT/JP2015/068936
§ 371 (c)(1),
(2) Date: Dec. 20, 2016

(87) PCT Pub. No.: WO2016/027569
PCT Pub. Date: Feb. 25, 2016

(65) Prior Publication Data
US 2017/0229971 A1    Aug. 10, 2017

(30) Foreign Application Priority Data
Aug. 20, 2014    (JP) .............................. 2014-167079

(51) Int. Cl.
*H02M 3/335* (2006.01)
*H01F 27/28* (2006.01)
(Continued)

(52) U.S. Cl.
CPC ........ *H02M 3/33546* (2013.01); *H01F 27/22* (2013.01); *H01F 27/24* (2013.01);
(Continued)

(58) Field of Classification Search
CPC . H02M 3/33546; H02M 3/28; H01F 27/2876; H01F 37/00; H01F 27/00–36; H01F 27/24; H01F 27/28; H01F 27/32
(Continued)

(56) References Cited

U.S. PATENT DOCUMENTS

| | | | | |
|---|---|---|---|---|
| 4,549,130 A | * | 10/1985 | Dobberstein | ........... H01F 19/04 |
| | | | | 323/308 |
| 7,477,121 B2 | * | 1/2009 | Martin | ................ H01F 27/2852 |
| | | | | 336/182 |

(Continued)

FOREIGN PATENT DOCUMENTS

| | | |
|---|---|---|
| JP | 63-90821 U | 6/1988 |
| JP | 11-251164 A | 9/1999 |

(Continued)

OTHER PUBLICATIONS

International Search Report (PCT/ISA/210) issued in PCT Application No. PCT/JP2015/068936 dated Sep. 15, 2015 with English translation (five pages).

(Continued)

*Primary Examiner* — Shawki S Ismail
*Assistant Examiner* — Demetries A Gibson
(74) *Attorney, Agent, or Firm* — Crowell & Moring LLP (57) ABSTRACT

An object of the present invention is to provide a small-sized and highly heat-dissipative reactor and a DC-DC converter using the reactor. A reactor according to the present invention includes a plate bus bar, a core, and a heat sink. The core includes a middle leg portion. The heat sink cools the plate bus bar. The plate bus bar is formed such that a winding axis of a winding including the plate bus bar passes through the middle leg portion. A main surface of the plate bus bar is disposed in parallel with a direction of the winding axis and thermally connected to the heat sink via an insulating layer.

7 Claims, 10 Drawing Sheets

(51) Int. Cl.
*H01F 37/00* (2006.01)
*H01F 27/22* (2006.01)
*H01F 27/24* (2006.01)
*H01F 27/32* (2006.01)
*H02M 3/28* (2006.01)

(52) U.S. Cl.
CPC ......... *H01F 27/28* (2013.01); *H01F 27/2847* (2013.01); *H01F 27/2876* (2013.01); *H01F 27/32* (2013.01); *H01F 37/00* (2013.01); *H02M 3/28* (2013.01)

(58) Field of Classification Search
USPC .................................................. 336/200, 232
See application file for complete search history.

(56) References Cited

U.S. PATENT DOCUMENTS

| | | | | |
|---|---|---|---|---|
| 7,498,921 | B1* | 3/2009 | Wang | H01F 27/2852 336/200 |
| 2002/0167388 | A1* | 11/2002 | Usui | H01F 17/0013 336/200 |
| 2003/0227365 | A1* | 12/2003 | Chen | H01F 3/14 336/182 |
| 2007/0139149 | A1* | 6/2007 | Arai | H01F 27/022 336/90 |
| 2007/0216512 | A1* | 9/2007 | Sano | H01F 17/043 336/212 |
| 2012/0139684 | A1* | 6/2012 | Kobayashi | H01F 27/022 336/92 |
| 2012/0176749 | A1* | 7/2012 | Arisawa | H02M 3/00 361/728 |
| 2013/0063234 | A1* | 3/2013 | Kamath | H01F 27/2804 336/57 |
| 2013/0106547 | A1* | 5/2013 | Takahashi | H01F 27/306 336/60 |
| 2013/0118002 | A1* | 5/2013 | Burke | H01F 27/26 29/605 |
| 2013/0222101 | A1* | 8/2013 | Ito | H01F 17/04 336/83 |
| 2014/0176291 | A1 | 6/2014 | Zheng et al. | |
| 2015/0085532 | A1* | 3/2015 | Tanahashi | H01F 27/306 363/17 |
| 2015/0170819 | A1* | 6/2015 | Yamashima | H01F 37/00 336/61 |
| 2016/0234928 | A1* | 8/2016 | Nakamura | B60R 16/0238 |

FOREIGN PATENT DOCUMENTS

| | | |
|---|---|---|
| JP | 2002-208521 A | 7/2002 |
| JP | 2002-353045 A | 12/2002 |
| JP | 2005-143215 A | 6/2005 |
| JP | 2009-59954 A | 3/2009 |
| JP | 2011-129573 A | 6/2011 |
| JP | 2011-181856 A | 9/2011 |
| JP | 2013-51402 A | 3/2013 |

OTHER PUBLICATIONS

Japanese-language Written Opinion (PCT/ISA/237) issued in PCT Application No. PCT/JP2015/068936 dated Sep. 15, 2015 (four pages).

* cited by examiner

Prior Art

FIG. 2C

Prior Art

REACTOR AND DC-DC CONVERTER USING SAME

TECHNICAL FIELD

The present invention relates to a reactor and a DC-DC converter using the reactor and especially relates to a reactor to be used in an electric vehicle and a plug-in hybrid vehicle and a DC-DC converter using the reactor.

BACKGROUND ART (Configuration of DC-DC Converter)

An electric vehicle and a plug-in hybrid vehicle include an inverter for driving a motor by a high voltage storage battery for driving power and a low voltage storage battery for operating an auxiliary machine such as a light and a radio of the vehicle. Such vehicles include a DC-DC converter unit. The DC-DC converter unit converts power from the high voltage storage battery to the low voltage storage battery or converts power from the low voltage storage battery to the high voltage storage battery (for example, refer to PTL 1).

The DC-DC converter unit includes a high voltage-side switching circuit for converting a DC high-voltage into an AC voltage, a transformer for converting an AC high-voltage into an AC low-voltage, and a low voltage-side rectifier circuit for converting an AC low voltage into a DC voltage.

Figure 1:
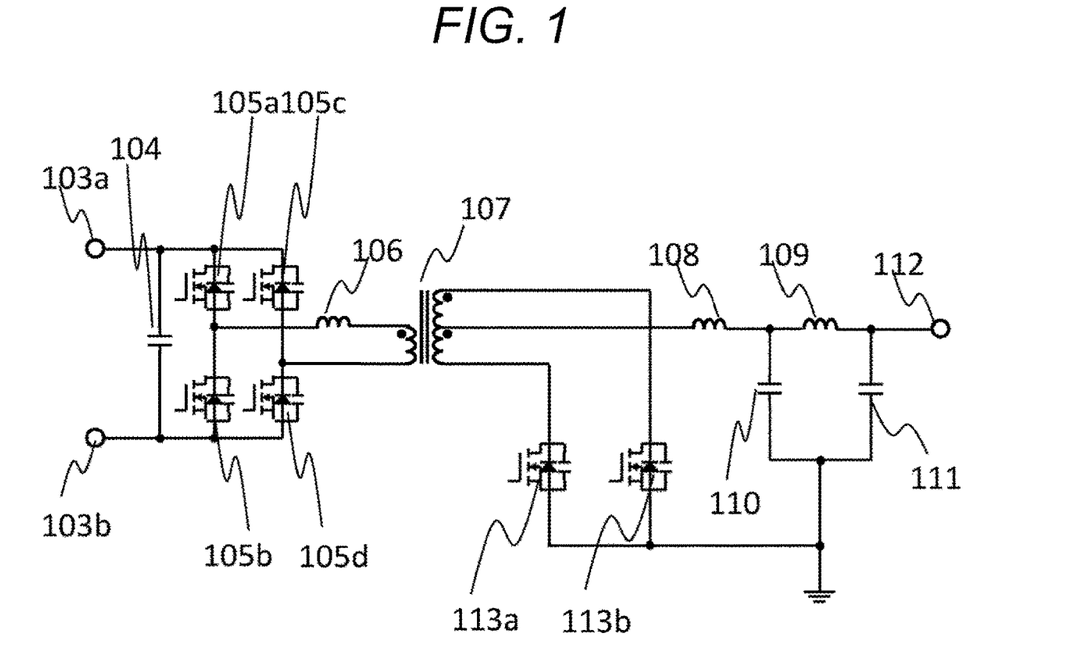
FIG. 1 is a diagram illustrating a circuit configuration of a DC-DC converter.

FIG. 1 indicates a general circuit configuration of a DC-DC converter unit. The DC-DC converter unit includes high voltage-side terminals 103a and 103b and further includes a low voltage-side terminal 112. As a high voltage-side switching circuit, four MOSFETS 105a to 105d are connected in an H bridge form, and a smoothing capacitor 104 is connected on an input side of the circuit A first winding of a transformer 107 is connected to an output line of the circuit via a resonance coil 106. As the transformer 107, a center tap-type transformer is used in which a middle point of a second-side winding is pulled out on the winding outside. As a low voltage-side rectifier circuit, a smoothing circuit including a chock coil 108 and a capacitor 110 is connected to a rectifier circuit using diode or MOSFETS 113a and 113b, and further a filter coil 109 and a filter capacitor 111 for noise suppression are connected.

(Conventional Reactor Structure)

Figure 2A:
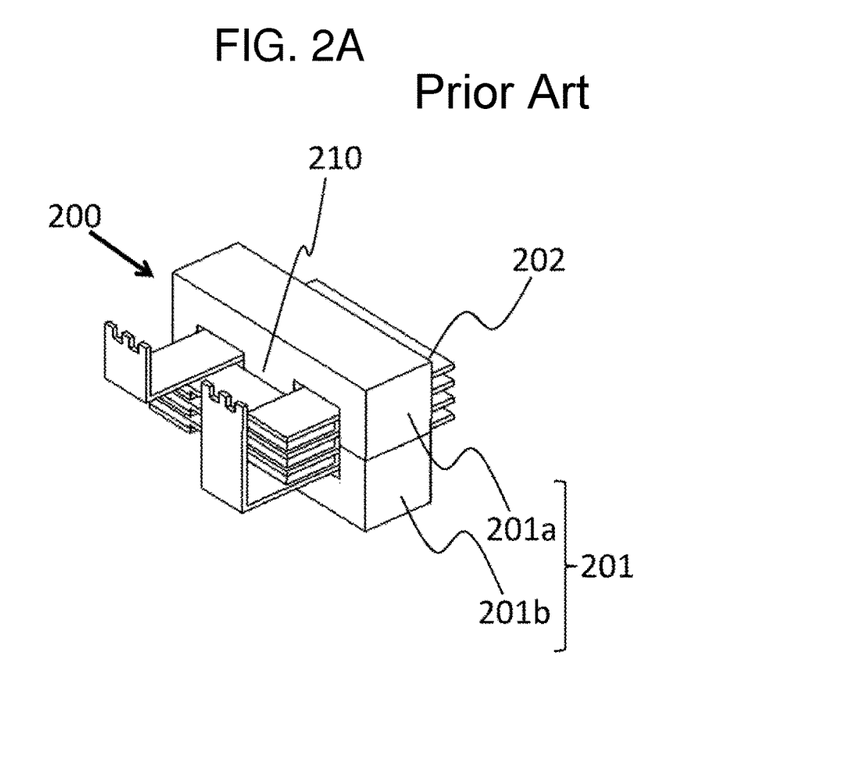
FIG. 2A is a perspective view illustrating a conventional reactor structure.
Figure 2B:
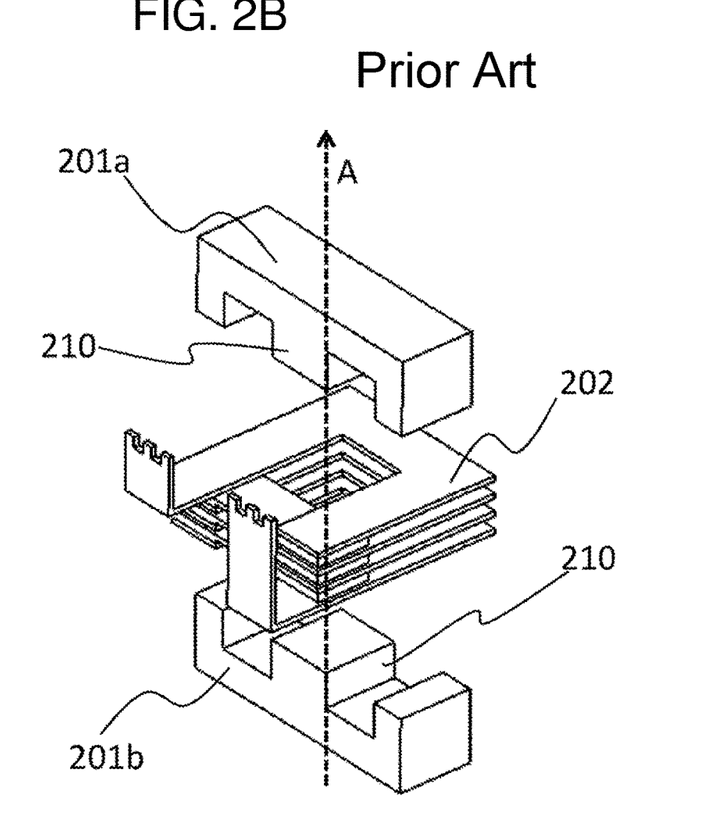
FIG. 2B is an exploded perspective view illustrating the conventional reactor structure.

To reduce a winding loss of a reactor in a DC-DC converter unit for large power output, a plate bus bar in which a cross-sectional area is large can is often used as a winding (for example, refer to PTL 2 and PTL 3). FIGS. 2(a) and 2(b) indicate a representative reactor structure which is generally used. By combining E-type cores 201a and 201b, a core portion 201 including a middle leg portion 210 is disposed, and a winding is formed in the middle leg portion 210 by using the plate bus bar 202. Here, a main surface of the plate bus bar 202 is vertical to a winding axis direction A of the winding. The main surface is a surface on the side of a larger plate area. As a heat dissipation structure of the above-described reactor, a configuration illustrated in FIG. 2(c) can be used. Here, the plate bus bar 202 forming a reactor winding is thermally connected to the heat sink 203 via heat dissipation sheets 204a and 204b. As a result, a temperature increase of the plate bus bar 202 can be suppressed.

(Issue of Conventional Reactor)

Figure 2C:
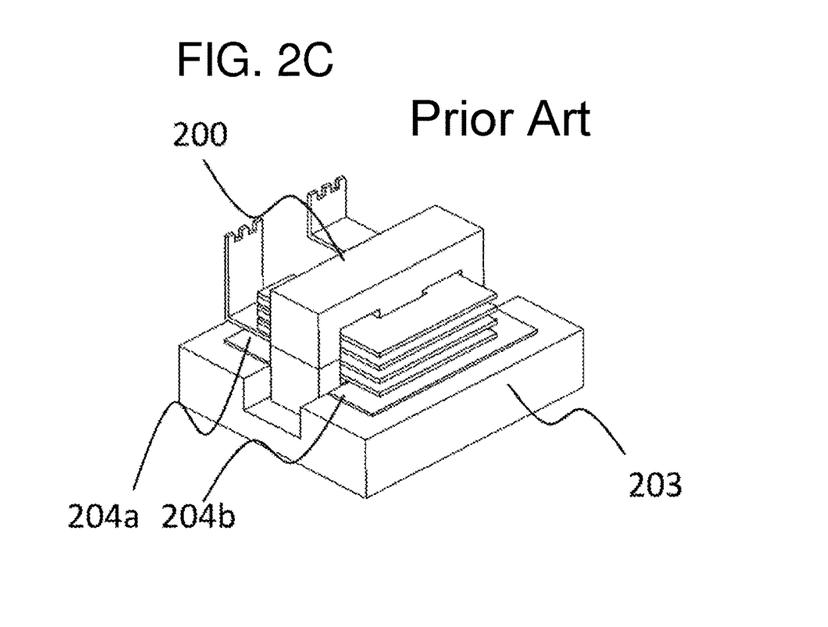
FIG. 2C is a perspective view illustrating a heat dissipation structure of the conventional reactor structure.

In the case where the above-described reactor and the above-described heat dissipation structure are used, a temperature of the plate bus bar 202 is sufficiently reduced by sufficiently increasing a width of the plate bus bar 202 and increasing a heat dissipation area to the heat sink 203. In the case, the plate bus bar 202 has a structure in which a part of the plate bus bar 202 which becomes a heat dissipation surface is projected from the core portion 201. Therefore, a size of the reactor is entirely increased, and a mounting space is increased.

CITATION LIST

Patent Literatures

PTL 1: JP 2005-143215 A
PTL 2: JP 2002-353045 A
PTL 3: JP 2011-129573 A

SUMMARY OF INVENTION

Technical Problem

As described above, in a reactor using a plate bus bar as a winding, heat dissipation is secured by increasing a width of a bus bar and thermally connecting to a heat sink via a heat dissipation sheet. However, a volume of the entire reactor is increased by increasing an area of the plate bus bar, and a mounting space for the reactor is increased.

Solution to Problem

A reactor according to the present invention includes a plate bus bar, a core portion, and a heat sink. The core portion includes a middle leg portion. The heat sink cools the plate bus bar. The plate bus bar is formed such that a winding axis of a winding including the plate bus bar passes through the middle leg portion. Further, the plate bus bar is disposed such that a main surface of the plate bus bar is parallel to a direction of the winding axis and thermally connected to the heat sink via an insulating layer.

Advantageous Effects of Invention

According to an implementation of the present invention, a temperature increase of a reactor can be suppressed, and the reactor can be down-sized. In addition, a power converter including the reactor can be down-sized.

DESCRIPTION OF EMBODIMENTS

Hereinafter, embodiments of the present invention will be described with reference to drawings.

First Embodiment (Basic Structure of Reactor 300)

Figure 3A:
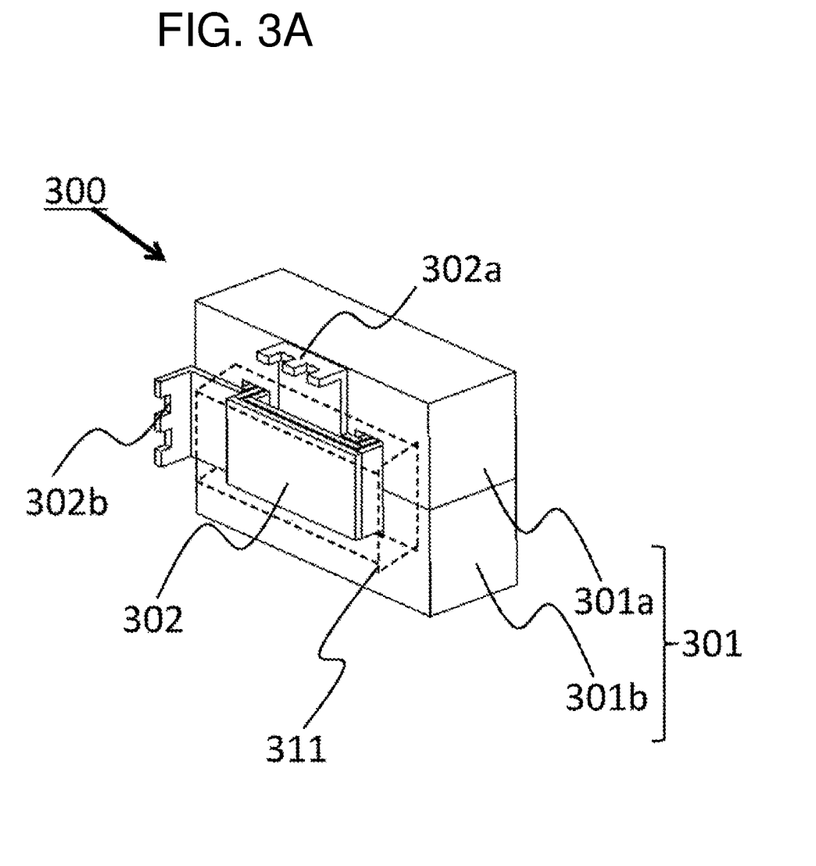
FIG. 3A is an external perspective view of a reactor 300 according to an embodiment described herein.
Figure 3B:
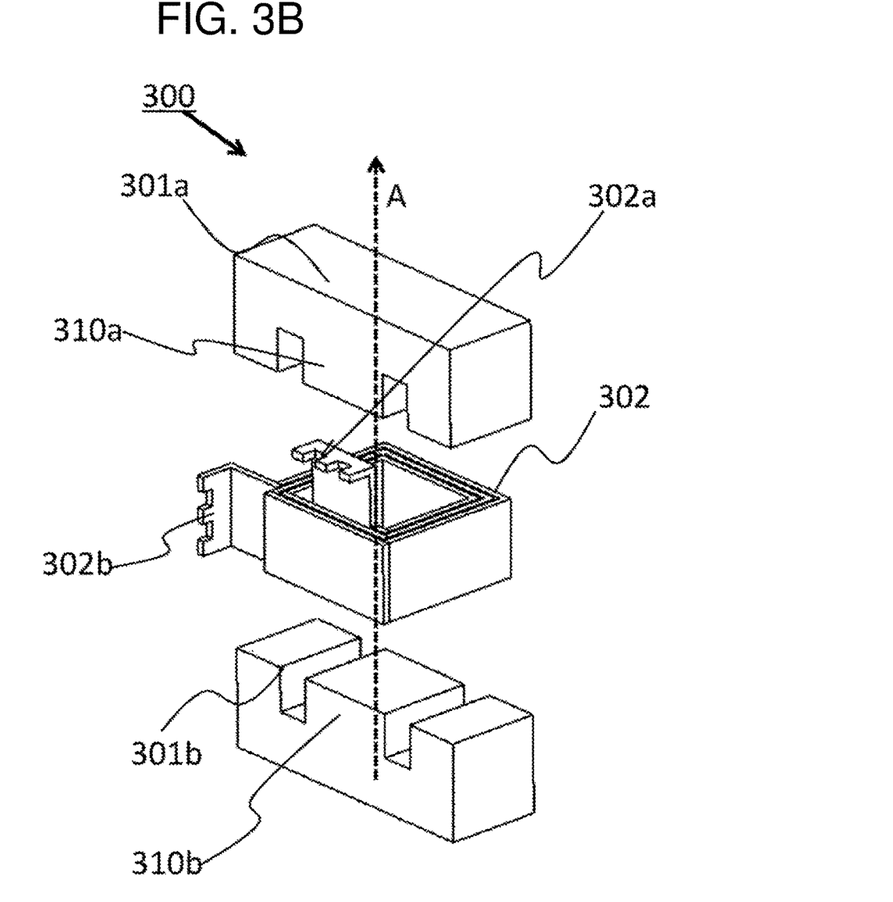
FIG. 3B is an exploded perspective view of the reactor 300.
Figure 3C:
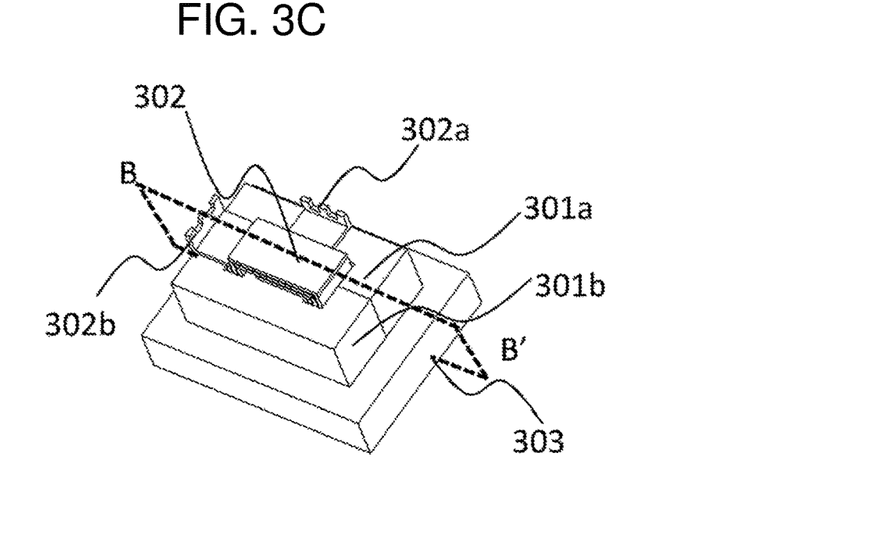
FIG. 3C is a perspective view for illustrating a heat dissipation structure of the reactor 300.

FIG. 3(a) is an external perspective view of a reactor 300 according to a first embodiment. FIG. 3(b) is an exploded perspective view of the reactor 300. FIG. 3(c) is a perspective view for illustrating a heat dissipation structure of the reactor 300.

Figure 3D:
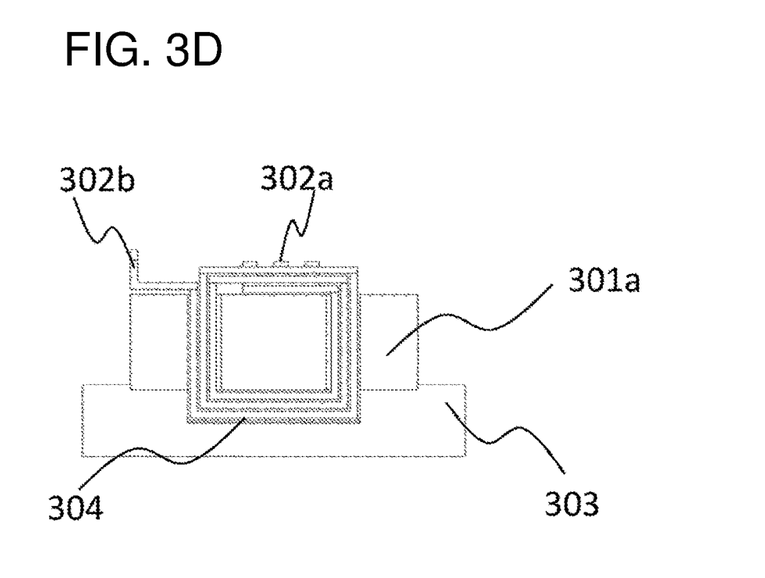
FIG. 3D is a sectional view on a plane BB' illustrated in FIG. 3C.

FIG. 3(d) is a sectional view on a plane BB' illustrated in FIG. 3(c).

A structure of the present embodiment will be described with reference to FIGS. 3(a) and 3(b). A core portion 301 including a middle leg portion is disposed by combining E-type cores 301a and 301b, and windings are formed in the middle leg portions 310a and 310b by the plate bus bar 302. Here, a main surface of the plate bus bar 302 is parallel to a winding axis direction of the winding. Connection terminal units 302a and 302b are provided to the plate bus bar 302 to connect to other parts. Thus, by winding the plate bus bar 302, the size of a projected portion of a winding 311 from the core portion 301 can be reduced in comparison with a conventional example. Therefore, the structure enables downsizing of a reactor.

(Heat Dissipation Structure of Reactor 300)

As a heat dissipation structure of the above-described reactor 300, a configuration illustrated in FIG. 3(c) is used. As described in a sectional view of FIG. 3(d), a main surface of the plate bus bar 302 disposed on a side opposite to the connection terminal units 302a and 302b across the core 301 is connected to a heat sink 303 via a heat dissipation sheet 304. As a result, a temperature increase can be suppressed by forming a heat dissipation structure of a plate bus bar.

When the reactor 300 and the heat dissipation structure of the reactor 300 are used, downsizing and high heat dissipation of the reactor 300 can be realized, and a mounting space is not increased as in the conventional example. In addition, as needed, by increasing an area of a main surface of the plate bus bar 302 by being connected to the heat sink 303 via the heat dissipation sheet 304, heat dissipation can be further improved without increasing a size of the reactor 300.

Second Embodiment (Reactor Basic Structure)

Figure 4A:
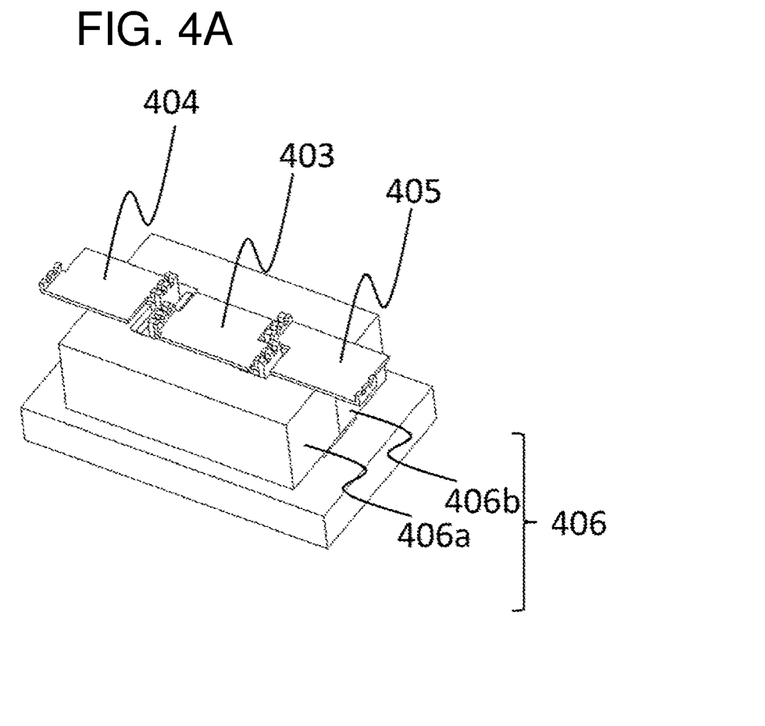
FIG. 4A is a perspective view illustrating a reactor according to a second embodiment.
Figure 4B:
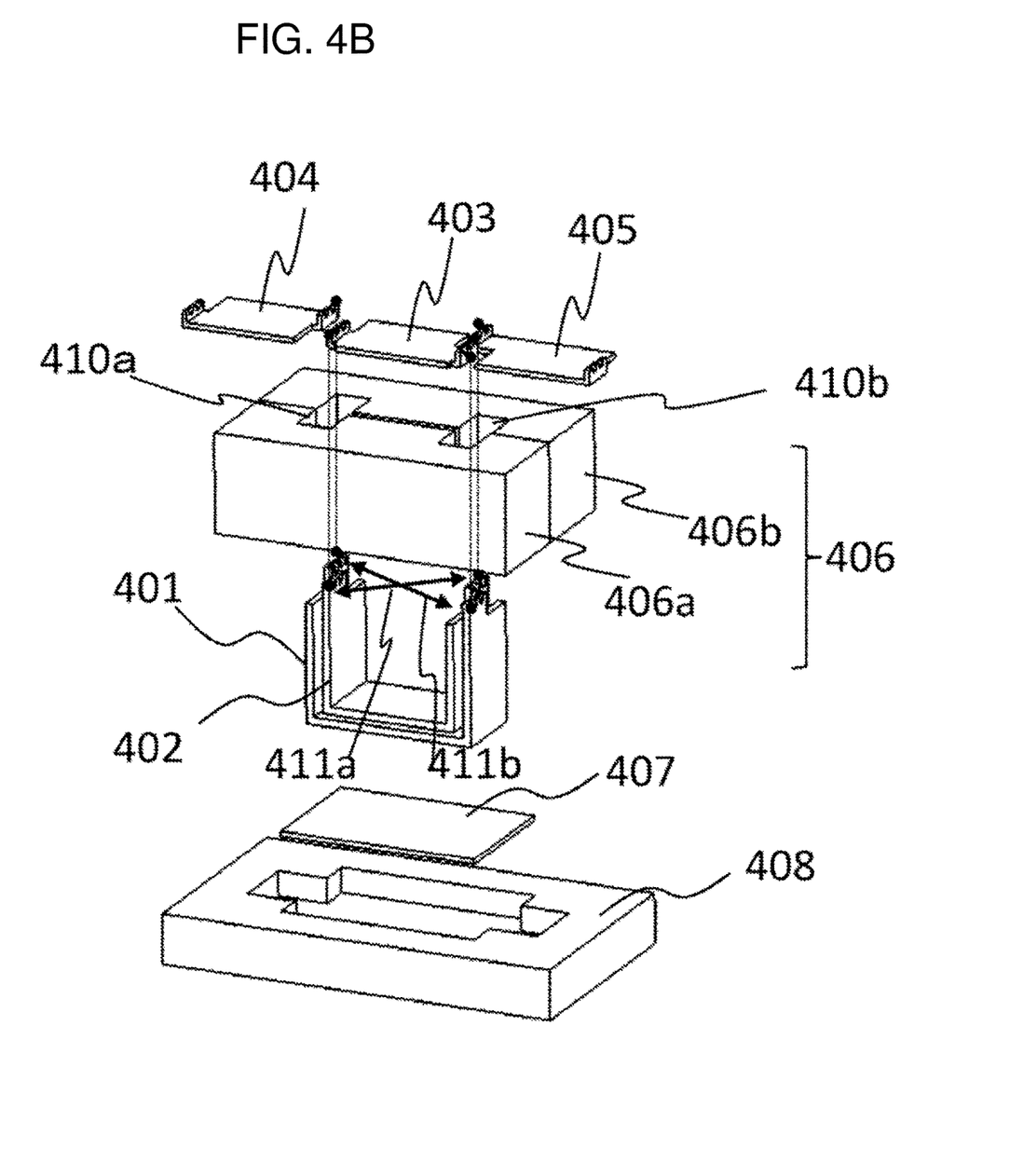
FIG. 4B is an exploded perspective view of the reactor according to the second embodiment.

FIG. 4(a) is a perspective view illustrating a reactor according to a second embodiment. FIG. 4(b) is an exploded perspective view of the reactor according to the second embodiment. In the first embodiment, a reactor winding is formed by bending a sheet of the plate bus bar 202. However, in the second embodiment, a reactor winding is formed by connecting a plurality of plate bus bars. FIG. 4 illustrates a configuration in which a winding is wound approximately two turns. However, a number of turns can be increased by adding a plate bus bar.

A core 406 includes an E-type core 406a and an E-type core 406b. The plate bus bars 401 and 402 bent in a U-shape are disposed such that main surfaces becomes parallel to each other, and end portions of the plate bus bars 401 and 402 are disposed so as to project from the through holes 410a and 410b of the core 406. A gap 411b is provided between one end and another end of the plate bus bar 401, and a gap 411a is provided between one end and another end of the plate bus bar 402.

A plate bus bar 403 which is different from the plate bus bars 401 and 402 is disposed, and one end of the plate bus bar 403 is connected to the plate bus bar 401, and another end is connected to the plate bus bar 402. Further, each of the plate bus bars 404 and 405 for connecting to other parts is connected to the plate bus bars 401 and 402. By connecting a plurality of bus bars in this manner, a winding wound around a middle leg portion of the core 406 can be formed. In the plate bus bar 401, a main surface on a side opposite to a terminal unit across the core 406 is thermally connected to a heat sink 408 via a heat dissipation sheet 407. Accordingly, a heat dissipation surface is formed.

In the case of forming a winding wound a plurality of turns by bending a sheet of a plate bus bar as in the first embodiment, it becomes difficult to process the plate bus bar depending on a thickness and a width thereof. In addition, in the case where a processing accuracy is not sufficient, gaps between windings needs to be increased to ensure insulation. Consequently, the size of a reactor may be increased. However, in the second embodiment, a winding can be easily formed by combining a plurality of bus bars. In addition, each bus bar has a simple shape, therefore a processing accuracy is superior, and a winding structure can be downsized.

Third Embodiment (Reactor Basic Structure)

Figure 5A:
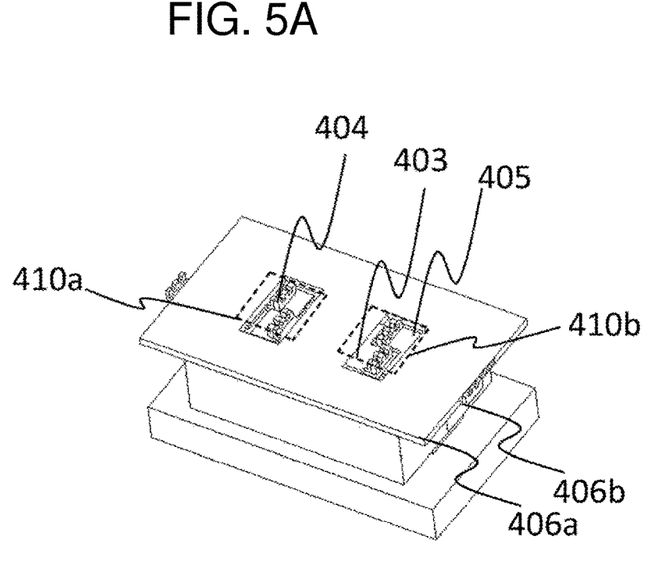
FIG. 5A is a perspective view illustrating a reactor according to a third embodiment.
Figure 5B:
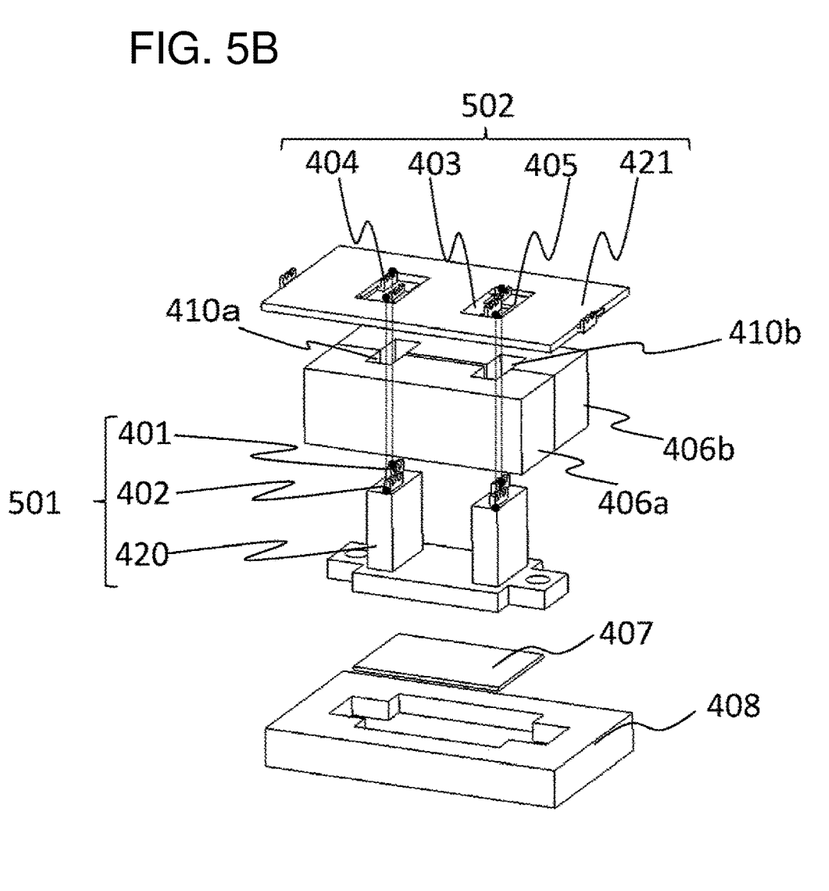
FIG. 5B is an exploded perspective view illustrating the reactor according to the third embodiment.

FIG. 5(a) is a perspective view illustrating a reactor according to a third embodiment. FIG. 5(b) is an exploded perspective view illustrating the reactor according to the third embodiment. A wiring structure in the third embodiment is same as in the second embodiment. However, a wiring module 501 is formed by sealing the plate bus bars 401 and 402 other than terminal units thereof by a molding material 420. Further, a wiring body 502 is formed by sealing the plate bus bars 403 to 405 by a molding material 421. The wiring body 502 has a plate shape and therefore can be substituted by such as a printed circuit board.

(Configuration Effect)

Figure 5C:
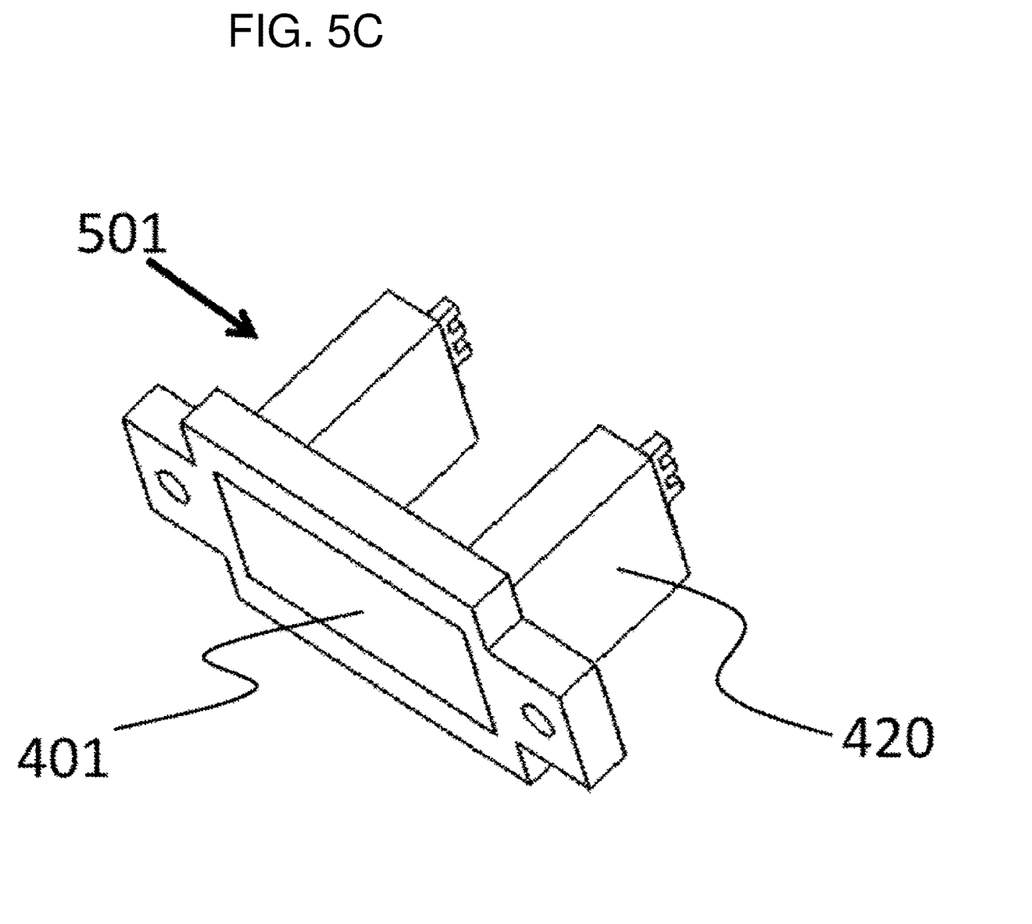
FIG. 5C is a perspective view of a wiring body 501 to be used in the reactor according to the third embodiment when viewed from a heat dissipation surface side.

A bus bar and a core can be supported by adding a mechanism for fixing the wiring bodies 501 and 502 to the heat sink 408 by using a screw in molding material portions of the wiring bodies. Further, as illustrated in FIG. 5(c), a heat dissipation path via the heat dissipation sheet 407 can be formed by exposing a plate bus bar on a heat sink side of the wiring body 501.

Fourth Embodiment (Structure of DC-DC Converter)

Figure 6A:
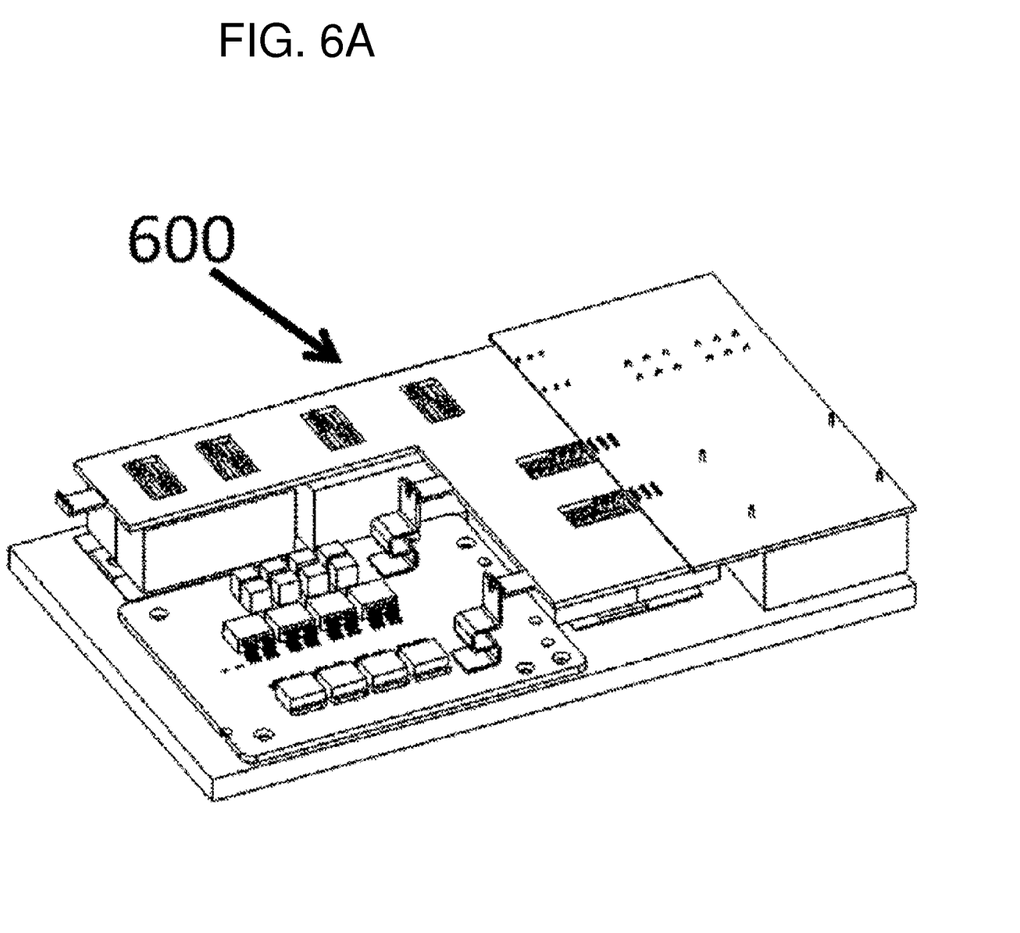
FIG. 6A is a perspective view illustrating a mounting structure of a DC-DC converter using the above-described reactor.
Figure 6B:
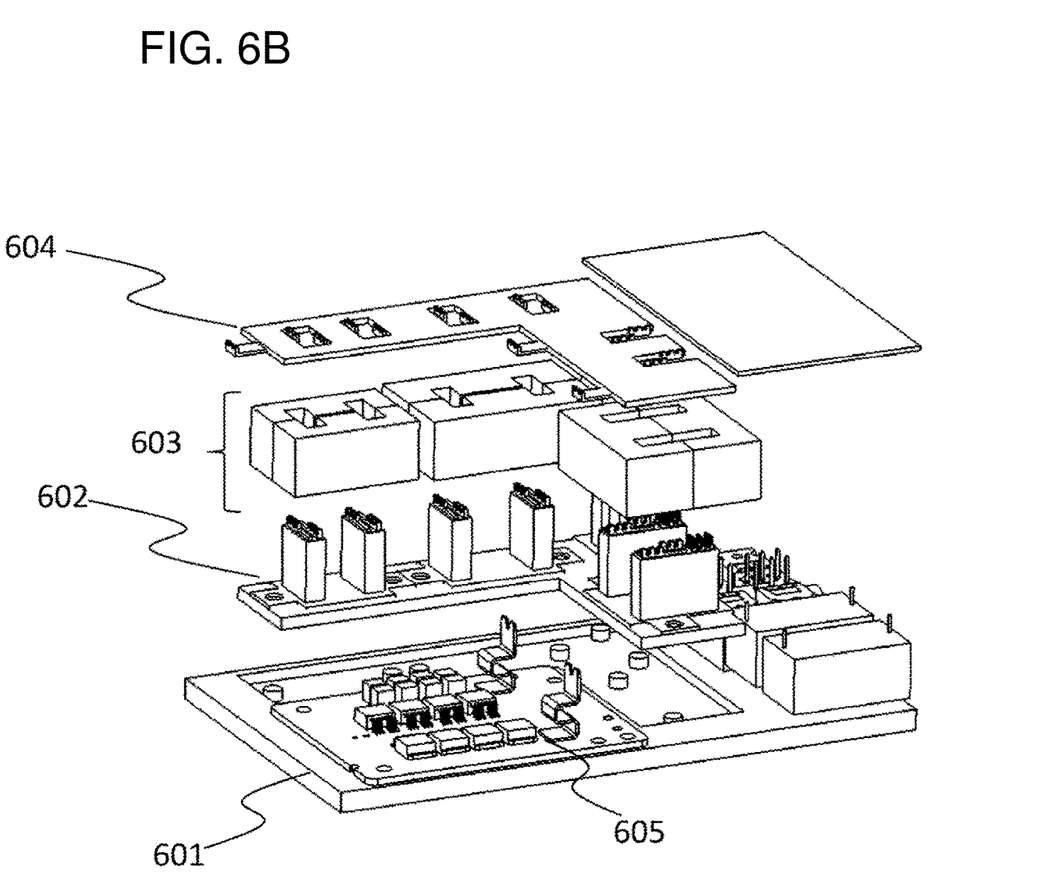
FIG. 6B is an exploded perspective view of the DC-DC converter.

FIG. 6(a) is a perspective view illustrating a mounting structure of a DC-DC converter 600 using the above-described reactor. FIG. 6(b) is an exploded perspective view of the DC-DC converter 600.

A DC-DC converter 600 includes a plurality of reactors including a resonance coil, a transformer, a chock coil, and a filter coil.

A wiring body 602 includes a plurality of wiring bodies having the same configuration as with the wiring body 501 described in the second and third embodiments, and the wiring bodies are integrated with the wiring body 602. In response to a number of the reactors, a plurality of the core portions 603 are provided.

The wiring body 604 has, for example, a configuration as described below.

A plurality of the reactors illustrated in FIG. 4(b) in the second embodiment is included, and the plate bus bar 404 of one of the reactors is connected to the plate bus bar 401 or the plate bus bar 402 of another one of the reactors. Further, a housing 601 which functions as a heat sink is thermally connected, via an insulating layer, to an exposed surface of the plate bus bar 401 or the plate bus bar 402 of one of the reactors and an exposed surface of the plate bus bar 401 or the plate bus bar 402 of another one of the reactors.

The structure described in the third embodiment is applicable in all of the reactor structures described herein, and a DC-DC converter can be downsized by integrating wiring bodies.

REFERENCE SIGNS LIST 103a high pressure-side input unit
103b high pressure-side input unit
104 smoothing capacitor
105a to 105d MOSFET
106 resonance coil
107 transformer
108 chock coil
109 filter coil
110 smoothing capacitor
111 filter capacitor
112 lower pressure-side output unit
113a and 113b MOSFET
200 reactor
201a and 201b core
201 core portion
202 plate bus bar
203 heat sink
204a and 204b heat dissipation sheet
301a and 301b core
301 core portion
302 plate bus bar
302a and 302b connection terminal unit
303 heat sink
304 heat dissipation sheet
311 projected portion of winding
401 to 405 plate bus bar
406a and 406b core
406 core portion
407 heat dissipation sheet
408 heat sink
410a and 410b through hole
411a gap
411b gap
420 and 421 molding material
501 and 502 wiring body
600 DC-DC converter
601 housing
602 and 603 wiring body
603 core portion

The invention claimed is:

1. A reactor comprising:
a core portion including a middle leg portion;
a plate bus bar wound around the core portion, the plate bus bar including:
a first wiring body disposed in a through hole in the core portion adjacent to the middle leg portion, the first wiring body including a first plurality of plate bus bars in a stacked arrangement and a first molding material that seals the first plurality of plate bus bars except for terminals thereof, and
a second wiring body having a plate shape and being disposed on top of the core portion, the second wiring body including a second plurality of plate bus bars arranged adjacent to each other in a same plane and a second molding material that seals the second plurality of plate bus bars except for terminals thereof,
wherein the plate bus bar is wound around the middle leg portion such that a direction in which the first plurality of plate bus bars is stacked is perpendicular to a direction of a winding axis, around which the plate bus bar is wound.

2. The reactor according to claim 1, wherein
the the terminals of the first plurality of plate bus bars are disposed outside of the core portion, and
the terminals of the first plurality of plate bus bars are connected to the terminals of the second plurality of plate bus bars.

3. The reactor according to claim 2, comprising an insulating substrate in which a third bus bar is buried.

4. A plurality of reactors, comprising at least two reactors according to claim 1,
wherein the plate bus bar of one of the reactors is connected to the plate bus bar of another one of the reactors.

5. A DC-DC converter, comprising the plurality of reactors according to claim 4.

6. The reactor according to claim 1, comprising a heat sink configured to cool the plate bus bar via an insulating layer.

7. A DC-DC converter, comprising:
the reactor according to claim 1, and
a heat sink configured to cool the plate bus bar via an insulating layer.

* * * * *